United States Patent
Rogers

(10) Patent No.: US 7,520,909 B2
(45) Date of Patent: Apr. 21, 2009

(54) LOW TEMPERATURE METHODS FOR HYDROGEN PRODUCTION

(75) Inventor: Charles J. Rogers, Cincinnati, OH (US)

(73) Assignee: Rogers Family Revocable Living Trust, Cincinnati, OH (US)

( * ) Notice: Subject to any disclaimer, the term of this patent is extended or adjusted under 35 U.S.C. 154(b) by 434 days.

(21) Appl. No.: 11/143,301

(22) Filed: Jun. 2, 2005

(65) Prior Publication Data

US 2005/0271579 A1    Dec. 8, 2005

Related U.S. Application Data

(60) Provisional application No. 60/576,724, filed on Jun. 3, 2004.

(51) Int. Cl.
C01B 3/00 (2006.01)
C01B 3/02 (2006.01)
C01B 3/22 (2006.01)

(52) U.S. Cl. ............... 48/197 FM; 48/197 R; 48/127.9; 423/213.2; 423/213.5

(58) Field of Classification Search ............ 48/197 FM, 48/127.3, 127.7, 128, 197 R; 423/352, 364, 423/395, 396, 419.1, 648.1, 213.2, 213.5; 208/428, 431
See application file for complete search history.

(56) References Cited

U.S. PATENT DOCUMENTS

| | | | | | |
|---|---|---|---|---|---|
| 2,734,929 | A | * | 2/1956 | Doumani et al. | 585/433 |
| 3,018,242 | A | * | 1/1962 | Gorin | 208/429 |
| 3,642,607 | A | * | 2/1972 | Seitzer | 208/431 |
| 4,092,236 | A | * | 5/1978 | Heredy | 208/404 |
| 4,180,452 | A | * | 12/1979 | Sinor | 208/402 |
| 4,210,518 | A | * | 7/1980 | Wilson et al. | 208/413 |
| 4,345,989 | A | * | 8/1982 | Vernon et al. | 208/419 |
| 4,398,450 | A | * | 8/1983 | Louhio | 91/477 |
| 4,411,766 | A | * | 10/1983 | Garg et al. | 208/409 |
| 4,609,456 | A | * | 9/1986 | Deschamps et al. | 208/112 |
| 4,631,183 | A | * | 12/1986 | Lalancette et al. | 588/316 |
| 5,064,526 | A | * | 11/1991 | Rogers et al. | 208/262.5 |
| 5,068,466 | A | * | 11/1991 | Motion et al. | 568/781 |
| 5,120,430 | A | * | 6/1992 | Morgan | 208/428 |
| 5,228,982 | A | * | 7/1993 | Scouten et al. | 208/400 |
| 5,332,489 | A | * | 7/1994 | Veluswamy | 208/56 |
| 5,336,819 | A | * | 8/1994 | McAuliffe et al. | 585/240 |
| 5,360,679 | A | | 11/1994 | Buswell et al. | |
| 5,399,632 | A | * | 3/1995 | Costello et al. | 525/339 |
| 5,454,934 | A | * | 10/1995 | Reynolds et al. | 208/423 |
| 5,648,571 | A | * | 7/1997 | Rogers et al. | 570/227 |
| 6,130,362 | A | * | 10/2000 | Joo et al. | 585/434 |
| 6,197,269 | B1 | * | 3/2001 | Jansen et al. | 423/243.01 |
| 6,358,488 | B1 | * | 3/2002 | Suda | 423/657 |
| 6,509,000 | B1 | * | 1/2003 | Choudhary et al. | 423/652 |
| 6,953,873 | B2 | * | 10/2005 | Cortright et al. | 585/733 |
| 6,995,115 | B2 | * | 2/2006 | Wang et al. | 502/328 |
| 7,083,657 | B2 | * | 8/2006 | Mohring et al. | 48/61 |
| 7,160,344 | B2 | * | 1/2007 | Choudhary et al. | 48/198.7 |
| 2002/0007594 | A1 | * | 1/2002 | Muradov | 48/78 |
| 2002/0082458 | A1 | * | 6/2002 | Peters et al. | 585/242 |
| 2002/0173650 | A1 | * | 11/2002 | Nolan et al. | 546/2 |
| 2003/0044349 | A1 | * | 3/2003 | Reichman et al. | 423/650 |
| 2004/0102313 | A1 | * | 5/2004 | Blacker et al. | 502/162 |
| 2005/0065024 | A1 | * | 3/2005 | Wang et al. | 502/328 |

FOREIGN PATENT DOCUMENTS

| | | | | |
|---|---|---|---|---|
| JP | 09234372 | A | * | 9/1997 |
| JP | 11228102 | A | * | 8/1999 |
| RU | 2071932 | C1 | * | 1/1997 |
| WO | WO 9420591 | A1 | * | 9/1994 |

OTHER PUBLICATIONS

Robert A.W. Johnstone et al, "Heterogeneous Catalytic Transfer Hydrogenation and Its Relation to Other Methods for Reduction of Organic Compounds", *Chem. Rev.*, 1985, 85, pp. 127-170.

H. Wiener et al, "Application of Aqueous Formate Salts As Hydrogen Donors In Reduction Processes: A Techno-Economic Comparison With Pressurized and Electrically Generated Hydrogen Gas", *Inter. J. Hydrogen Energy*, 14(6):365-370 (1989).

Nicholas A. Cortese et al, "Palladium-Catalyzed Reductions of α, β-Unsaturated Carbonyl Compounds, Conjugated Dienes and Acetylenes and Traiikylammonium Formate", *J. Org. Chem.*, 43(20):3985-87 (1978).

E.A. Braude et al, "Hydrogen Transfer, Part VIII*. Metal-catalysed Transfer-hydrogenation of Miscellaneous Acceptors," *J. Chem. Soc.*, pp. 3585-3598 (1954).

\* cited by examiner

*Primary Examiner*—Walter D Griffin
*Assistant Examiner*—Huy-Tram Nguyen
(74) *Attorney, Agent, or Firm*—Porter Wright Morris & Arthur LLP

(57) ABSTRACT

Methods for the production of hydrogen comprise heating a hydrogen-bearing feed material capable of undergoing a hydrogenation reaction in the presence of a hydrogen donor material, a catalyst promoting catalytic transfer hydrogenation, and a base at a temperature of from about 150° C. to about 450° C. for a time sufficient to hydrogenate the feed material and to dehydrogenate the hydrogenated feed material to produce hydrogen and carbon, and collecting the resulting hydrogen.

20 Claims, No Drawings

LOW TEMPERATURE METHODS FOR HYDROGEN PRODUCTION

RELATED APPLICATION

The present application claims priority under 35 U.S.C. §119 to U.S. application Ser. No. 60/576,724 filed Jun. 3, 2004.

FIELD OF THE INVENTION

The present invention is directed to methods for the production of hydrogen, and, more particularly, to such methods which employ temperatures lower than the 900° C. to 1000° C. temperatures employed in typical conventional hydrogen-producing processes.

BACKGROUND OF THE INVENTION

The demand for hydrogen in industry and in consumer areas continues to grow. With the developments of hydrogen-powered fuel cells and the like, the demand for hydrogen may soon be increasing at even faster rates. Commercial hydrogen production technology generally requires the use of temperatures in a range of from 900° to 1000° C. and the use of hydrocarbons as prime feedstock. Hydrocarbon feed stocks can quickly escalate in price and/or be subject to supply interruptions. When feed stock and production costs are evaluated, hydrogen is often seen as too costly of a fuel, thereby limiting development of a hydrogen economy. Not only would it be desirable to develop hydrogen production methods which employ lower temperatures to reduce the cost of production, it would also be advantageous to obtain hydrogen from materials other than hydrocarbon feed stocks.

Various thermochemical, photo electrochemical, thermal water splitting and gasification technologies for hydrogen production are under development, although the economic feasibility of such techniques remains to be determined. In 2003, the U.S. Departments of Energy and Agriculture funded a number of research and development projects and demonstration projects directed to hydrogen and chemical production from biomass. The current methods under development for producing hydrogen include splitting of water into component parts of hydrogen and oxygen, converting hydrocarbons into hydrogen and carbon dioxide by reaction over a catalyst, electrolysis, steam electrolysis, thermochemical techniques, photochemical techniques, and gasification using heat to decompose biomass or coal into a gas stream for hydrogen production.

However, a need still exists for improved processes for hydrogen production.

SUMMARY OF THE INVENTION

Accordingly, it is an object of the present invention to provide new methods for hydrogen production. It is an additional object of the invention to provide methods for hydrogen production which may be conducted at temperatures lower than those employed in many conventional processes. These and additional objects are provided by the present invention.

In one embodiment, the invention is directed to a method for the production of hydrogen The method comprises heating a hydrogen-bearing feed material capable of undergoing a hydrogenation reaction in the presence of a hydrogen donor material, a catalyst promoting catalytic transfer hydrogenation, and a base at a temperature of from about 150° C. to about 450° C. for a time sufficient to hydrogenate the feed material and to dehydrogenate the hydrogenated feed material to produce hydrogen and carbon, and collecting the resulting hydrogen.

The methods of the present invention are advantageous in producing hydrogen at lower temperatures than those employed in many conventional processes and/or from various suitable hydrogen-bearing feed materials. These and additional objects and advantages will be more fully apparent in view of the following detailed description.

DETAILED DESCRIPTION

The present invention is directed to methods for producing hydrogen. More specifically, the present methods employ Catalytic Transfer Hydrogenation (CTH) techniques for the production of hydrogen from various suitable hydrogen-bearing feed materials. The inventive methods employ lower temperatures than many conventional processes and many processes currently under development. The CTH-based methods are conducted at relatively low temperature, i.e., at a temperature in a range of from about 150° C. to about 450° C., and are simple and relatively low cost to operate. The methods produce hydrogen and a solid carbon product from the feed material without release of carbon oxides, or other detrimental oxides, into the environment. Additionally, in accordance with further embodiments of the invention, the carbon residue product may be reacted with water to produce hydrogen by reaction with water. Alternatively, the carbon residue product may be recovered for additional uses or processing.

One conventional hydrogenation process employs molecular hydrogen and hydrides for the reduction of organic compounds. Catalytic Transfer Hydrogenation (CTH) processes were originally developed in the early 1950's with the overall objective of providing safer methods for the synthesis of organic compounds by avoiding use of molecular hydrogen. See Braude et al, *J. Chem. Soc.*, 1954, p. 3595. In comparison to conventional methods, catalytic transfer hydrogenation methods eliminate the danger associated with handling of molecular hydrogen by employing hydrogen donors to supply needed hydrogen for the reduction of organic compounds. Johnstone et al, *Chem. Review*, 85:129-170 (1985), provide a comprehensive review of early CTH developments. Many CTH processes require precious metal catalysts and special hydrogen donors. Additionally, the early CTH processes often produced low product yields, although subsequently developed processes improved yields with the addition of higher concentrations of catalyst. In general, CTH methods have the ability to operate at low to moderate temperature to effect the synthesis of important compounds. See Wiener et al, *Inter. J. Hydrogen Energy*, 14(6):365-379, and Nicholas et al, *J. Org. Chem.*, 43(20):3985-87 (1978). Chemical methods have previously been developed for the destruction of toxic and hazardous materials, as set forth in the Rogers et al U.S. Pat. No. 5,648,571. These processes employ hydrogen donors and non-metallic catalysts and operated at temperatures of 290° C. to 350° C. to effect detoxification of halogenated and non-halogenated toxic and hazardous materials.

The present processes are capable of converting cellulosic and noncellulosic hydrogen-bearing feed materials to hydrogen, carbon and other mineralized products. The hydrogen-bearing feed material suitable as a feed stock for the present invention may be any hydrogen-bearing feed material capable of undergoing a hydrogenation reaction, including, but not limited to, a biomass, for example, forestry products or by products, crop residue, animal waste, municipal waste, cellulosic refuse, or a mixture of two or more of these materials. In another embodiment, the hydrogen-bearing feed material may comprise a hydrogen-bearing salt, for example, an ammonium salt. In one embodiment, the feed material may be dried prior to combination with the hydrogen donor material, catalyst and base. Optionally, the feed material may be processed to particle form or by other size reduction processing. In one embodiment, particles of from about 1 to 4 inches are suitable; in other embodiments, particles of about 100 to about 200 mesh are suitable. Advantageously, the present methods avoid release of carbon, sulfur and nitrogen oxides into the environment. While organically bound nitrogen and sulfur have in the past posed handing and disposal problems, the present methods bind these atoms in salt form, for example as sodium sulfide and ammonium hydroxide.

The hydrogen donor material which is employed in the inventive methods is a material which provides reactive hydrogen in the reaction mixture during heating. While not intending to be bound by theory, it is believed that the reactive hydrogen provided by the hydrogen donor may be in the form of hydrogen ion, or in the form of a hydride, atomic hydrogen, or other forms. Suitable hydrogen donor materials include, but are not limited to, $C_8$-$C_{22}$ hydrocarbons, crude oil, for example shale oil, waste oil, number 6 fuel oil, plastic, rubber, for example tires, asphalt, or a mixture of two or more of these. In one embodiment, the hydrogen donor is employed in an amount of at least about 20% by weight, more specifically at least about 40%, and more specifically about 50 to about 60% by weight, based on total weight of the contents of the reactor. Optionally, the hydrogen donor may be used to prewet the feed material. Prewetting may improve both feeding rates and hydrogen production rates.

In order to activate the hydrogen-bearing material to release hydrogen, a catalyst is employed. The catalyst promotes catalytic transfer hydrogenation, whereby the feed material is first hydrogenated and then dehydrogenated to form hydrogen. The catalyst is employed in an effective amount. In one embodiment, the catalyst is employed in an amount of from about 1% to about 20%, more specifically from about 1% to about 10%, by weight of reactor contents. When the reaction medium is heated to temperatures of 150° C. to 450° C., the catalyst promotes the hydrogenation of feed material and removes non-hydrogen atoms. Suitable catalysts include, but are not limited to, saturated or unsaturated hydrocarbons, alcohols, or fatty acids, catalytic forms of carbon, nickel, iron, palladium, or a mixture of two or more of these. In a second and simultaneous step, the hydrogenated feed material undergoes dehydrogenation with release of substantially all hydrogen from the hydrogen-bearing feed material. While not wishing to be bound by theory, it is believed that the reaction scheme can be illustrated as follows:

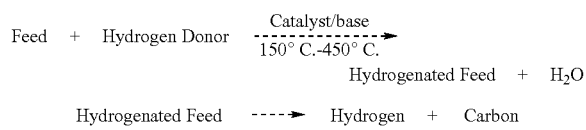

Again, not wishing to be bound by theory, in an embodiment wherein the feed material comprises an ammonium salt, for example ammonium sulfate, it is believed that a reaction scheme can be further illustrated as follows:

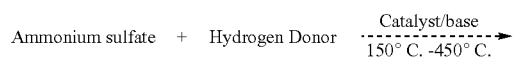
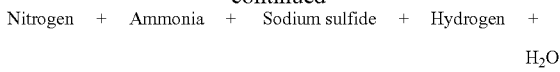

Thus, advantageously, the hetero atoms form salts, for example, sodium sulfide which may be further reduced to sulfur, and ammonia which may be further reduced to nitrogen, and do not form oxides which are undesirable for atmospheric release.

The base which is employed is preferably an alkali metal compound and/or an alkaline earth metal compound. Oxides, hydroxides, carbonates, bicarbonates and the like may be used. In a specific embodiment, the base comprises sodium hydroxide, as it is low in cost, only small amounts are consumed during hydrogen and carbon production, and it may be recovered and reused repeatedly in the methods of the invention, particularly in batch processing. The base may be added in a liquid carrier, for example, water, and is typically employed in an amount of from about 1% to about 20%, more specifically, from about 1% to about 10%, by weight of the feed material, for the hydrogenation-dehydrogenation reactions. In one embodiment, sodium hydroxide is employed in the reaction medium in concentrations ranging from about 1% to about 20% by weight of the added feed material. In a further embodiment, the base is sodium hydroxide in aqueous form and may be used to pretreat the hydrogen-bearing feed material, if desired. Optionally, a portion or all of the catalyst may be included in the sodium hydroxide aqueous solution for pretreating the feed material. After hydrogen production is complete, sodium hydroxide may be reclaimed from the reaction medium, along with carbon, by centrifugation and may be reused in subsequent batches of materials.

The reaction mixture formed by the combination of the hydrogen-bearing feed material capable of undergoing a hydrogenation reaction and the hydrogen donor material, the catalyst promoting catalytic transfer hydrogenation, and the base is heated at a temperature of from about 150° C. to about 450° C. for a time sufficient to hydrogenate the feed material and to dehydrogenate the hydrogenated feed material to produce hydrogen and carbon. In a more specific embodiment, the reaction mixture is heated at a temperature of from about 150° C. to about 350° C., or, more specifically, from about 250° C. to about 300° C. The time necessary for hydrogen production may vary depending on other process conditions. In a specific embodiment, and depending on reactor size, the reaction mixture is heated for about 1 to about 4 hours in order to heat the mixture from room temperature to a temperature sufficient to effect hydrogen production. Once a reaction mixture has reached the desired temperature, hydrogen production will be achieved in less than about 60 minutes, for example about 1 to about 30 minutes, more specifically about 3 to about 15 minutes. The reaction mixture may optionally be stirred during heating. Typically, batch processing may be conveniently employed; however, the present methods may be conducted under continuous conditions if desired.

In the presence of at least one base, for example an alkali metal hydroxide or an alkaline earth metal compound, the hydrogen-bearing feed material undergoes decomposition by catalytic transfer hydrogenation reactions and subsequently catalytic dehydrogenation to produce molecular hydrogen, a carbon residue and water as major products. Because the reactions are carried out in a chemically reductive environment, no carbon oxides or other greenhouse gases are produced in the hydrogen and carbon production process.

One specific embodiment of the present invention comprises placing a hydrogen donor material into a treatment vessel with an alkali metal hydroxide in an amount of 10% by weight of the hydrogen donor material, and heating the contents with stirring to 250° C. to 300° C. A catalyst selected from saturated and unsaturated hydrocarbons, fatty acids, and alcohols, alone or in combination with reactive carbon, in a concentrations of 1-10 percent of the weight of the reaction mixture is introduced into the treatment vessel. A biomass feed material that has been dried and undergone size reduction to 1-4 inch pieces is fed directly into the bottom of the heated vessel while the contents are continuously being stirred. The biomass materials are quickly converted to hydrogen and carbon products.

In another specific embodiment, an aqueous sodium hydroxide solution is prepared containing at least about 50% by weight sodium hydroxide. Catalyst is added to this solution in an amount of at least 1% by weight, based on the weight of the hydrogen-bearing feed material. The feed material is soaked with the sodium hydroxide solution-catalyst mixture. The treated feed material is combined with the hydrogen donor material and heated in a treatment vessel. Added water may be removed by heating the feed material prior to combination with the hydrogen donor material, and/or by heating in the presence of the hydrogen donor material.

In yet another specific embodiment, the reaction mixture may be processed in a tube reactor, particularly for solid reactants. Solid hydrogen donors may optionally be reduced in size, for example to 100-200 mesh particle size, for use in such reactors. Hydrogen production can be achieved in 1 to 10, more specifically 3 to 5, minute residence times.

In a further embodiment, nitrogen gas may be present in head space of the reaction vessel. This may be advantageous to remove oxygen from the head space during hydrogen production.

When biomass materials or heteroatom materials are processed by the present CTH process, hydrogen is rapidly produced and collected from the process gas stream. The gaseous product stream generally contains high hydrogen concentrations, approaching 100%. Hydrogen from the process is suitable for use as fuel or in other applications. The carbon product comprises amorphous carbon and may remain in the treatment vessel in the mixture of base and hydrogen donor. When a treatment cycle has been completed, carbon may be recovered from this mixture, for example by centrifugation.

The high density of sodium hydroxide allows it to readily be separated from the lower density amorphous carbon and the hydrogen donor by centrifugation, for example at speeds of 1000 to 1500 rpm. At these rpm, there are generally three zones of separation: a hydrogen donor top layer, a carbon middle layer, and a bottom layer comprising sodium hydroxide or a mixture of sodium hydroxide with sodium salts of any anions reacted with sodium hydroxide. When a low boiling point hydrocarbon is used, the hydrogen donor top layer may be easily recovered and reused. Residual hydrogen donor may be removed from the carbon by heating carbon to above the boiling point of the hydrogen donor or by solvent extraction. Final residual hydrogen donor removal may not be required, for example, if this product is to be used to produce artificial graphite. All recovered hydrocarbons and hydrogen donors may be easily recovered and reused.

In a further embodiment, the carbon may be reacted with water to produce additional hydrogen.

According to the present methods, hydrogen may be produced in a simple yet efficient manner. The present methods can be conducted in small, mobile plants, if desired, and can reduce landfill and refuse disposal costs by using waste materials as the hydrogen-bearing feed materials.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. A method for the production of hydrogen, comprising heating a hydrogen-bearing biomass feed material capable of undergoing a hydrogenation reaction in the presence of a hydrogen donor material, a catalyst promoting catalytic transfer hydrogenation, and a base at a temperature of from about 150° C. to about 450° C. for a time sufficient to hydrogenate the feed material and to dehydrogenate the hydrogenated feed material and produce hydrogen and carbon, and collecting the resulting hydrogen.

2. The method of claim 1, wherein the hydrogen donor material comprises $C_8$-$C_{22}$ hydrocarbon, crude oil, waste oil, plastic, rubber, or a mixture of two or more thereof.

3. The method of claim 1, wherein the catalyst comprises a saturated or unsaturated hydrocarbon, alcohol, or fatty acid, a catalytic form of carbon, or a mixture of two or more thereof.

4. The method of claim 3, wherein the feed material is heated in the presence of a $C_8$-$C_{22}$ hydrocarbon, the catalyst promoting catalytic transfer hydrogenation, and sodium hydroxide at a temperature of from about 150° C. to about 450° C.

5. The method of claim 1, wherein the base comprises an alkali metal or alkaline earth metal compound, or a mixture of two or more thereof.

6. The method of claim 5, wherein the base comprises sodium hydroxide in solid or aqueous form.

7. The method of claim 6, wherein the sodium hydroxide is added to the feed material in an aqueous form.

8. The method of claim 1, wherein the feed material is heated at a temperature of from about 150 ° C. to about 350° C.

9. The method of claim 1, wherein the feed material is heated at a temperature of from about 150° C. to about 450° C. for about 1 to about 4 hours.

10. The method of claim 9, wherein the feed material is stirred while being heated.

11. The method of claim 1, further comprising collecting the resulting carbon.

12. The method of claim 11, wherein the resulting carbon comprises amorphous graphite.

13. The method of claim 1, wherein products of the heating comprise hydrogen, carbon residue, hydrogen donor, catalyst, base, and water.

14. The method of claim 13, wherein the products further comprise base salts.

15. The method of claim 14, wherein the products are substantially free of greenhouse oxides.

16. The method of claim 1, further comprising a pretreatment step in which the hydrogen-bearing feed material is pretreated with an aqueous solution of base and catalyst, prior to combination with the hydrogen donor material.

17. The method of claim 1, wherein the hydrogen production is conducted in a reaction vessel having a nitrogen-containing head space.

18. A method for the production of hydrogen, comprising heating a hydrogen-bearing feed material capable of undergoing a hydrogenation reaction in the presence of a hydrogen donor material, a catalyst promoting catalytic transfer hydrogenation, and a base at a temperature of from about 150° C. to about 450° C. for a time sufficient to hydrogenate the feed material and to dehydrogenate the hydrogenated feed material and produce hydrogen and carbon, and collecting the resulting hydrogen,
   wherein the feed material comprises a biomass comprising forestry products or by products, crop residue, animal waste, municipal waste, cellulosic refuse, or a mixture of two or more thereof.

19. The method of claim 18, wherein the biomass feed material is heated at a temperature of from about 150° C. to about 350° C. for about 1 to about 4 hours.

20. The method of claim 18, wherein the catalyst comprises a saturated or unsaturated hydrocarbon, alcohol, or fatty acid, a catalytic form of carbon, or a mixture of two or more thereof.

* * * * *